United States Patent [19]

DeMoss, Jr.

[11] Patent Number: 4,738,377
[45] Date of Patent: Apr. 19, 1988

[54] METHOD AND APPARATUS FOR CONTROLLING RATE OF APPLICATION OF FERTILIZER

[76] Inventor: John E. DeMoss, Jr., DeMoss Springs Ranch, Route 1, Box 66,, Moro, Oreg. 97039

[21] Appl. No.: 909,004

[22] Filed: Sep. 17, 1986

[51] Int. Cl.⁴ .................................................. B67B 7/00
[52] U.S. Cl. .......................................... 222/1; 222/52; 239/172; 324/337
[58] Field of Search ................ 222/1, 30, 23, 52, 608, 222/614; 239/155, 172; 324/323, 337; 343/459

[56] References Cited

U.S. PATENT DOCUMENTS

| | | | |
|---|---|---|---|
| 3,806,795 | 4/1974 | Morey | 324/337 |
| 4,006,481 | 2/1977 | Young et al. | 324/337 |
| 4,013,224 | 3/1977 | Carter | 239/172 |
| 4,267,971 | 5/1981 | Johnston | 239/172 |
| 4,381,544 | 4/1983 | Stamm | 324/337 |

OTHER PUBLICATIONS

"Agri–Industry, Pulse", p 74; May/June 1986; article on Soil Mapping Device Surfaces.

Primary Examiner—Joseph J. Rolla
Assistant Examiner—Kenneth Noland
Attorney, Agent, or Firm—Dellett, Smith-Hill and Bedell

[57] ABSTRACT

A ground penetrating radar unit is scanned over the surface of a field, and provides a signal representative of the variation in the depth of soil along the scanning path. The signal is used to control the rate of application of fertilizer to the soil.

4 Claims, 1 Drawing Sheet

METHOD AND APPARATUS FOR CONTROLLING RATE OF APPLICATION OF FERTILIZER

This invention relates to method and apparatus for controlling rate of application of fertilizer.

BACKGROUND OF THE INVENTION

In order to increase the crop yield, it is conventional to apply fertilizer to the ground. On a commercial farming scale, a fertilizer applicator is moved across a field to be fertilized, and liquid or dry fertilizer is removed from the applicator and applied to the ground. This type of applicator, when first introduced, had no mechanism for adjusting the fertilizer application rate during application, e.g. in response to changes in depth of soil. The fertilizer rate could only be adjusted while the applicator was stationary, and the operator had to guess as to the depth of soil in order to determine the optimum application rate. If there were wide variations in depth of soil over the field, there may be areas in which the concentration of fertilizer in the soil was too low, with the result that the crop yield was lower than the potential yield, and areas in which the concentration of fertilizer was too high, with the result that the crop was damaged and no yield was provided.

Recently, an applicator for liquid fertilizer has been produced with a control system that allows the operator to adjust the rate of application of fertilizer as the applicator moves over the field to be fertilized. The control system includes a control console that is mounted in the tractor driver's cab and provides a signal to a control valve for determining the application rate. The tractor driver is therefore able to adjust the rate of application of fertilizer as the applicator is towed over the field. In order to use this capability to match the rate of application of fertilizer to the soil depth, it is necessary to know the manner in which the soil depth changes over the area of the field. Hitherto, it has been conventional to measure soil depth by manually probing the soil at various locations over the field. A given field to be fertilized might be a mile or more square, and if the soil is probed every hundred yards this implies that several hundred probes must be made in order to enable adjustment of the control valve every hundred yards. Therefore, this technique involves a great deal of labor. Moreover, the depth of soil can change significantly over distances that are much shorter than 100 yards. Accordingly, the information yielded by manual probing is not accurate enough to avoid under application and over application of fertilizer.

SUMMARY OF THE INVENTION

In a preferred embodiment of the present invention, a ground penetrating radar unit is scanned over the surface of a field, and provides a signal representative of the variation in the depth of soil along the scanning path. The signal is used to control the rate of application of fertilizer material to the soil.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
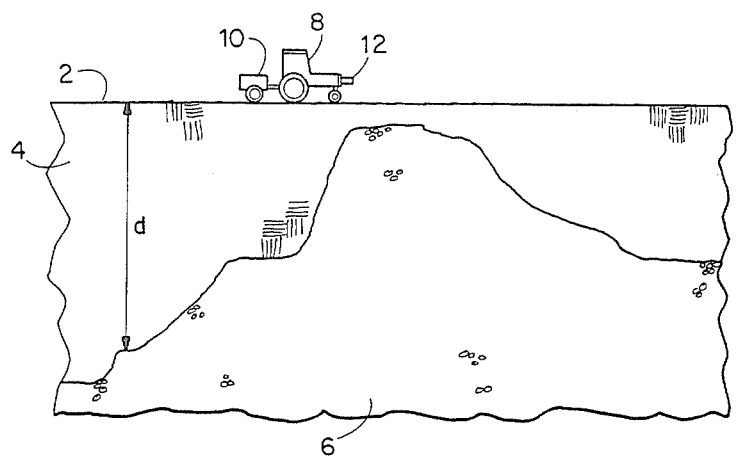
FIG. 1 illustrates schematically a system embodying the present invention.

In order to aid in an understanding of the invention, FIG. 1 illustrates a cross-section through the ground over a portion of a field that is to be fertilized. Beneath the surface 2 of the ground is a layer 4 of soil, and beneath the soil is a formation 6 of rock. The soil is a loose surface material consisting of disintegrated rock with an admixture of organic matter and soluble salts, and is able to support growth of plants. The depth d of the rock formation beneath the surface 2 of the ground varies over the field from as little as a few inches to several feet.

Figure 2:
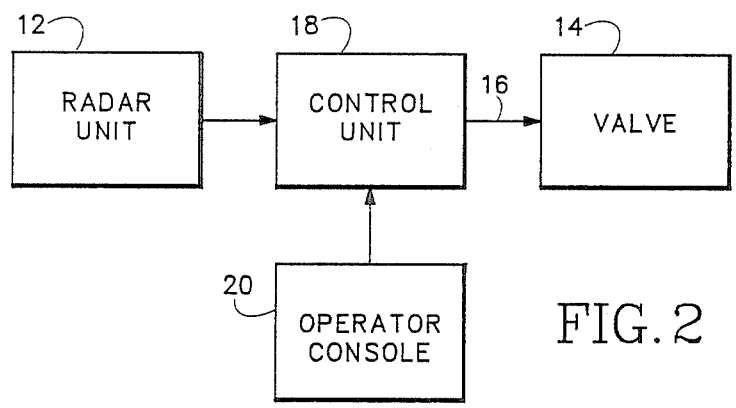
FIG. 2 illustrates the principal elements of the FIG. 1 system in greater detail.

A fertilizer applicator 10 is used to apply fertilizer to the ground. The fertilizer applicator 10 is of a conventional type, and has a valve 14 (FIG. 2) for controlling the rate of application of the fertilizer to the ground. The setting of the valve is controllable by means of a control signal applied to the valve over a control line 16. If, for example, the valve is adjusted by rotating a shaft, the control signal may be in the form of a train of pulses that drive a stepping motor to rotate the shaft through a predetermined angle to the desired setting. The direction of drive of the motor depends on the stator winding to which the control signal is applied. The fertilizer applicator is towed behind a tractor 8. The tractor carries a ground penetrating radar unit 12. The ground penetrating radar unit 12 is of the kind that is currently used in geophysical surveys, and operates by emitting a pulse of electromagnetic energy into the ground and detecting reflections of electromagnetic energy received from the ground. The electromagnetic energy penetrates the soil but is partially reflected from the interface between the soil layer 4 and the rock formation 6. Some of the reflected energy is detected by the radar unit, and by measuring the interval between emission of a pulse and detection of the reflected energy, the radar unit is able to provide an output signal that represents the depth d.

A control unit 18 receives the output signal of the radar unit 12 and provides the control signal to the valve 14. In the case of the example mentioned above, the control unit receives the signal representing the value d and for a selected change in the value d the control unit generates a pulse suitable to cause the rotor of the stepping motor to rotate by one angular step. The winding to which the pulse is applied depends on whether the value d increased or decreased.

The control unit receives additional signals from a user console 20 representing maximum and minimum rates of application of fertilizer. The user console is also to provide a signal that overrides the output signal provided by the radar unit and allows the rate of application of fertilizer to be manually controlled by the user through the console.

It will be appreciated that the present invention is not restricted to the particular embodiment that has been described with reference to the drawings, and that variations may be made therein without departing from the scope of the invention as defined in the appended claims and equivalents thereof. For example, the radar unit need not be mounted on the tractor, and may be mounted on the applicator itself. It is not essential that the output signal of the radar unit be used to control directly the setting of the control valve: the radar unit may provide a readout to the operator of the applicator, who then manually adjusts the rate of application through the operator console. Alternatively, the radar unit may be used to generate a record representing the value of the depth d as a function of position in the field to be fertilized, and this record may be subsequently used to control application of fertilizer to the field. The record might be a punched tape that is used by a tape reader to control the valve setting, or it might be in human-readable form and provided to the operator of the applicator to enable him to adjust the setting of the valve using a conventional control console as the applicator is towed over the field. The invention is not restricted to fertilizer as the crop enhancing material. For example, the potency of herbicides is dependent on clay content and organic matter content, and if the radar unit's output signal were representative of clay content or organic matter content, the signal could be used to control application of herbicides. The radar unit could also be used to locate hardpan and different soil types.

I claim:

1. A method of controlling the application of crop enhancing material to the ground, comprising:

transporting the crop enhancing material over the ground in a container having a valve through which the crop enhancing material is applied to the ground, the rate of application of crop enhancing material being dependent on the setting of the valve, employing a ground penetrating radar unit to generate a signal representative of the thickness of the soil beneath the ground surface, and employing said signal to control directly the setting of the valve and thereby control the rate at which crop enhancing material is applied to the ground.

2. A method according to claim 1, wherein the crop enhancing material is a fertilizer.

3. Apparatus for controlling the rate of application of crop enhancing material to the ground, comprising:

a container for containing crop enhancing material, the container having a valve through which crop enhancing material in the container is applied to the ground, and the rate of application of crop enhancing material from the container to the ground being dependent on the setting of the valve, means for transporting the container over the ground, a ground pentrating radar unit for providing a signal representative of the thickness of the soil beneath the ground surface, and control means responsive to the signal provided by the ground penetrating radar unit for controlling the setting of the valve and thereby controlling the rate of application of crop enhancing material to the ground.

4. Apparatus according to claim 3, comprising an operator console for enabling the signal porvided by the ground penetrating radar unit to be overridden.

* * * * *